United States Patent
Tico et al.

(10) Patent No.: US 10,306,140 B2
(45) Date of Patent: May 28, 2019

(54) MOTION ADAPTIVE IMAGE SLICE SELECTION

(75) Inventors: Marius Tico, Mountain View, CA (US); Frank Doepke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 973 days.

(21) Appl. No.: 13/490,031

(22) Filed: Jun. 6, 2012

(65) Prior Publication Data
US 2013/0329001 A1   Dec. 12, 2013

(51) Int. Cl.
*H04N 7/00* (2011.01)
*H04N 5/232* (2006.01)

(52) U.S. Cl.
CPC .............................. *H04N 5/23238* (2013.01)

(58) Field of Classification Search
CPC ... G06T 3/4038; H04N 5/232; H04N 5/23238
USPC .......................................................... 348/36
See application file for complete search history.

(56) References Cited

U.S. PATENT DOCUMENTS

| | | | |
|---|---|---|---|
| 5,237,413 A | 8/1993 | Israelsen | |
| 6,075,905 A | 6/2000 | Herman | |
| 6,094,215 A | 7/2000 | Sundahl | |
| 6,167,404 A | 12/2000 | Morcos | |
| 6,243,103 B1 | 6/2001 | Takiguchi | |
| 6,304,284 B1 | 10/2001 | Dunton | |
| 6,978,052 B2 | 12/2005 | Beged-Dov | |
| 7,006,124 B2 | 2/2006 | Peleg | |
| 7,409,105 B2 | 8/2008 | Jin | |
| 7,424,218 B2 | 9/2008 | Baudisch | |
| 7,460,730 B2 | 12/2008 | Pal | |
| 7,577,314 B2 | 8/2009 | Zhou | |
| 7,590,335 B2 | 9/2009 | Kobayashi | |
| 7,627,225 B2 | 12/2009 | Shimosato | |
| 7,656,428 B2 | 2/2010 | Trutna, Jr. | |
| 7,656,429 B2 | 2/2010 | Larson | |
| 7,746,404 B2 | 6/2010 | Deng | |
| 7,796,871 B2 | 9/2010 | Park | |
| 7,844,130 B2 | 11/2010 | Dong | |
| 7,912,337 B2 | 3/2011 | Souchard | |

(Continued)

FOREIGN PATENT DOCUMENTS

| CN | 101158889 A | 4/2008 |
|---|---|---|
| CN | 101228477 A | 7/2008 |

(Continued)

OTHER PUBLICATIONS

U.S. Appl. No. 13/109,875, filed May 17, 2011, Bhogal.

(Continued)

*Primary Examiner* — Farzana Hossain
(74) *Attorney, Agent, or Firm* — Blank Rome LLP

(57) ABSTRACT

Systems, methods, and computer readable media for adaptively selecting what portion (aka slice) of a first image (aka frame) is selected to overlap and blend with a second frame during frame capture operations are disclosed. In general, for every new frame captured in a sequence the overlap between it and the slice selected from a prior frame may be determined based, at least in part, on sensor output. If the overlap so determined is below a desired threshold, the position of the current frame's slice may be adjusted so as to provide the desired overlap.

27 Claims, 4 Drawing Sheets

(56) References Cited

U.S. PATENT DOCUMENTS

| | | | |
|---|---|---|---|
| 8,098,948 B1* | 1/2012 | Tzur | H03F 3/217 382/255 |
| 8,121,809 B2 | 2/2012 | Mealy | |
| 8,285,079 B2 | 10/2012 | Robertson | |
| 8,310,522 B2 | 11/2012 | Jeong | |
| 8,311,355 B2 | 11/2012 | Brunner | |
| 8,379,054 B2 | 2/2013 | Katayama | |
| 8,957,944 B2* | 2/2015 | Doepke | 348/211.4 |
| 2002/0126913 A1 | 9/2002 | Kotake | |
| 2002/0141002 A1 | 10/2002 | ManjiTakano | |
| 2002/0196353 A1 | 12/2002 | Nakahira | |
| 2004/0001639 A1 | 1/2004 | Ohno | |
| 2004/0066449 A1 | 4/2004 | Givon | |
| 2004/0155968 A1 | 8/2004 | Cheatle | |
| 2004/0201705 A1 | 10/2004 | Lin | |
| 2004/0233274 A1 | 11/2004 | Uyttendaele | |
| 2005/0088534 A1 | 4/2005 | Shen | |
| 2005/0168593 A1 | 8/2005 | Akizuki | |
| 2006/0114363 A1 | 6/2006 | Kang | |
| 2006/0115181 A1 | 6/2006 | Deng | |
| 2006/0215930 A1 | 9/2006 | Terui | |
| 2006/0224997 A1 | 10/2006 | Wong | |
| 2006/0268130 A1 | 11/2006 | Williams | |
| 2006/0280429 A1 | 12/2006 | Shimosato | |
| 2006/0291747 A1 | 12/2006 | Peterson | |
| 2007/0019882 A1 | 1/2007 | Tanaka | |
| 2007/0025723 A1 | 2/2007 | Baudisch | |
| 2007/0081081 A1 | 4/2007 | Cheng | |
| 2007/0085913 A1* | 4/2007 | Ketelaars et al. | 348/239 |
| 2007/0097266 A1 | 5/2007 | Souchard | |
| 2007/0236513 A1 | 10/2007 | Hedenstroem | |
| 2007/0237421 A1 | 10/2007 | Luo | |
| 2007/0237423 A1 | 10/2007 | Tico | |
| 2007/0258656 A1 | 11/2007 | Aarabi | |
| 2008/0056612 A1 | 3/2008 | Park | |
| 2008/0215286 A1 | 9/2008 | Mealy | |
| 2008/0253685 A1 | 10/2008 | Kuranov | |
| 2008/0309772 A1 | 12/2008 | Ikeda | |
| 2009/0021576 A1 | 1/2009 | Linder | |
| 2009/0058989 A1 | 3/2009 | Kim | |
| 2009/0190803 A1 | 7/2009 | Neghina | |
| 2009/0208062 A1 | 8/2009 | Sorek | |
| 2009/0231447 A1 | 9/2009 | Paik | |
| 2009/0244404 A1 | 10/2009 | Park | |
| 2010/0033553 A1* | 2/2010 | Levy | G06K 9/20 348/36 |
| 2010/0053303 A1 | 3/2010 | Hayashi | |
| 2010/0054628 A1 | 3/2010 | Levy | |
| 2010/0097442 A1 | 4/2010 | Lablans | |
| 2010/0097444 A1 | 4/2010 | Lablans | |
| 2010/0141735 A1* | 6/2010 | Yamashita | H04N 5/232 348/36 |
| 2010/0141737 A1 | 6/2010 | Li | |
| 2010/0165087 A1 | 7/2010 | Corso | |
| 2010/0188579 A1 | 7/2010 | Friedman | |
| 2010/0309336 A1 | 12/2010 | Brunner | |
| 2010/0328512 A1 | 12/2010 | Davidovici | |
| 2011/0002544 A1 | 1/2011 | Oshima | |
| 2011/0043604 A1 | 2/2011 | Peleg | |
| 2011/0058014 A1* | 3/2011 | Yamashita | H04N 5/23229 348/36 |
| 2011/0058015 A1 | 3/2011 | Moriyama | |
| 2011/0110605 A1 | 5/2011 | Cheong | |
| 2011/0116767 A1 | 5/2011 | Souchard | |
| 2011/0129126 A1 | 6/2011 | Begeja | |
| 2011/0141227 A1 | 6/2011 | Bigioi | |
| 2011/0141300 A1 | 6/2011 | Stec | |
| 2011/0157386 A1 | 6/2011 | Ishii | |
| 2011/0216156 A1 | 9/2011 | Bigioi | |
| 2011/0234750 A1 | 9/2011 | Lai | |
| 2011/0267544 A1 | 11/2011 | Mei | |
| 2011/0304688 A1 | 12/2011 | Ge | |
| 2012/0019614 A1* | 1/2012 | Murray | H04N 13/106 348/36 |
| 2012/0026165 A1* | 2/2012 | Morifuji | H04N 5/23238 345/419 |
| 2012/0076358 A1 | 3/2012 | Meadow | |
| 2012/0133639 A1 | 5/2012 | Kopf | |
| 2012/0155786 A1 | 6/2012 | Zargarpour | |
| 2012/0169840 A1 | 7/2012 | Yamashita | |
| 2012/0229595 A1 | 9/2012 | Miller | |
| 2012/0263397 A1 | 10/2012 | Kimura | |
| 2012/0274739 A1 | 11/2012 | Li | |
| 2012/0293607 A1* | 11/2012 | Bhogal et al. | 348/36 |
| 2012/0293608 A1* | 11/2012 | Doepke | H04N 5/23238 348/36 |
| 2012/0314945 A1 | 12/2012 | Cha | |
| 2013/0004100 A1 | 1/2013 | Putraya | |
| 2013/0033568 A1 | 2/2013 | Kim | |
| 2013/0063555 A1 | 3/2013 | Matsumoto | |
| 2013/0236122 A1 | 9/2013 | Drouot | |

FOREIGN PATENT DOCUMENTS

| | | |
|---|---|---|
| CN | 101379513 A | 3/2009 |
| CN | 100524187 C | 8/2009 |
| CN | 101600113 A | 12/2009 |
| CN | 101668118 A | 3/2010 |
| CN | 102037719 A | 4/2011 |
| EP | 0592136 | 4/1994 |
| EP | 1940152 A2 | 7/2008 |
| EP | 2018049 A2 | 1/2009 |
| JP | 2009290827 A | 12/2009 |
| WO | 9951027 A1 | 10/1999 |
| WO | 2004049257 A2 | 6/2004 |
| WO | 2006048875 A2 | 5/2006 |
| WO | 2009094661 | 1/2009 |
| WO | 2010025309 A1 | 4/2010 |
| WO | 2011033968 A1 | 3/2011 |
| WO | 2011039904 A1 | 4/2011 |

OTHER PUBLICATIONS

U.S. Appl. No. 13/109,878, filed May 17, 2011, Doepke.
U.S. Appl. No. 13/109,883, filed May 17, 2011, Doepke.
U.S. Appl. No. 13/109,889, filed May 17, 2011, Doepke.
U.S. Appl. No. 13/109,941, filed May 17, 2011, Doepke.
U.S. Appl. No. 13/489,950, filed Jun. 6, 2012, Doepke.
U.S. Appl. No. 13/490,183, filed Jun. 6, 2012, Tico.
U.S. Appl. No. 13/911,243, filed Jun. 6, 2013, Doepke.
'Panoramic Image Projections', http://www.cambridgeincolour.com/tutorials/image-projections.htm, 9 pages, May 12, 2011.
'Photo Stitching Digital Panoramas', http://www.cambridgeincolour.com/tutorials/digital-panoramas.htm, 11 pages, May 12, 2011.
'Using Photo Stitching Software', http://www.cambridgeincolour.com/tutorials/photo-stitching-software.htm, 9 pages, May 12, 2011.
"Filter," in "The IEEE Standard Dictionary of Electrical and Electronics Terms—Sixth edition—IEEE Std 100-1996," 1997, IEEE, ISBN: 1-55937-833-6, pp. 408-409.
"Rendering by Manifold Hopping." Submitted to Siggraph '2001, Paper No. 194, Catgory: research. pp. 1-10.
Cha, Joon-Hyuk, et al., "Seamless and Fast Panoramic Image Stitching," 2012 IEEE International Conference on Consumer Electronics (ICCE), pp. 29-30.
Efros, Alexei. "Image Blending and Compositing." Computational Photography, CMU, Fall 2010. pp. 1-82.
International Search Report and Search Opinion for PCT Application No. PCT/US2012/033010, dated Jun. 19, 2012, 9 pages.
International Search Report and Search Opinion for PCT Application No. PCT/US2012/033010, dated May 17, 2012, 9 pages.
Joshi, Neei, et al., 'Image Deblurring using Inertial Measurement Sensors', ACM SIGGRAPH, New York, NY, 8 pages, Jul. 2010.
Levin, Anat, Assaf Zomet, Shmuel Peleg and Yair Weiss. "Seamless Image Stitching in the Gradient Domain." Proc. of the European Conference on Computer Vision (ECCV). Prague. May 2004. pp. 1-12.
McCann, James, Nancy S. Pollard. "Real-Time Gradient-Domain Painting." Computer Science Department, http://repository.cmu.edu/compsci/1257.

(56) References Cited

OTHER PUBLICATIONS

Methods of Adaptive Image Blending and Artifacts Masking for Panorama Creation. Apple. Inc. Camera Algorithm Team. Technical Report TR-2012-001.
PCT Search Report and Search Opinion for PCT Application No. PCT/US2012/034625, dated Jul. 31, 2012, 10 pages.
Perez, P., Gangnet, M., and Blake, A., Poisson Image Editing; ACM Transactions on Graphics (TOG) Proceedings of ACM SIGGRAPH 2003, vol. 22, iss. 3, pp. 313-318, Jul. 2003.
Yingen Xiang and Kari Pulli, "Fast Panorama Stitching for High-Quality Panoramic Images on Mobile Phones," IEEE Transactions on Consumer Electronics, vol. 56, pp. 298-306 (2010).

* cited by examiner

FIG. 1A
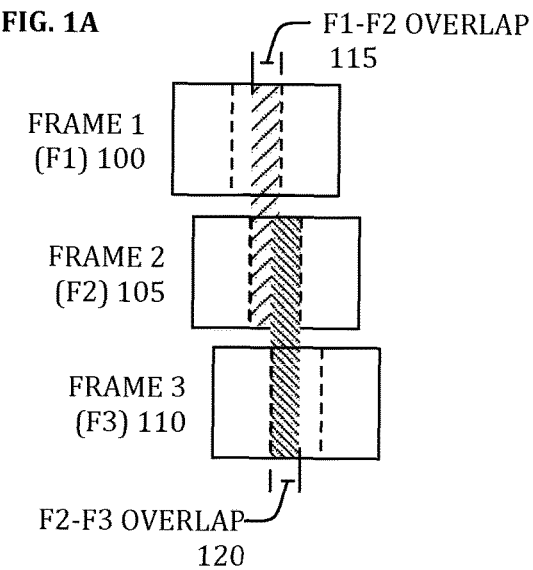
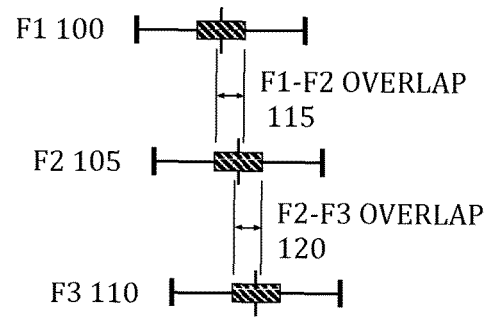
FIG. 1B
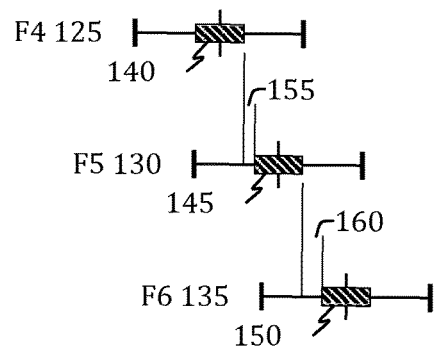
FIG. 1C

MOTION ADAPTIVE IMAGE SLICE SELECTION

BACKGROUND

This disclosure relates generally to the field of image processing and, more particularly, but not by way of limitation, to operations for adaptively selecting slices from within frames for panoramic image composition based on image capture device motion.

One way to generate a wide angle-of-view or panoramic image so that it may be viewed, for example, a two-dimensional display is to capture a sequence of images by rotating the camera between each image. The individual images can then be projected onto an imaginary cylindrical manifold, where after they can be blended to produce a final image. One problem inherent in using a cylindrical projection is that lines parallel to the horizon (e.g., curbs and tops of buildings) become curved. Further, because some portions of the image plane may not lie on the surface of the cylindrical manifold, it becomes necessary to "bend" the edges between adjacent frames to "make" them do so. As a consequence, the images will look distorted.

One way to compensate for this type of distortion is to perform a cylindrical warping operation. Such transformations are well-known and are computationally intensive; often times too intensive to permit the real-time generation of panoramic images. As used here, the term "real-time" means during the time when the images are being captured. While many desktop, notebook, and workstation computer systems have sufficient computational power to perform cylindrical warping operations in real-time, such devices do not lend themselves to image capture. In contrast, many portable devices such as mobile telephones and tablet computer systems can capture image sequences but generally lack the computational resources to perform the necessary operations in real-time.

SUMMARY

In one embodiment the inventive concept provides a method to generate a wide angle-of-view image. The method includes acquiring a first image and identifying, within it, a first slice region. A second image and information corresponding to the image capture device's motion may then be acquired. Motion information can come from one or more sensors proximate or affixed to the image capture device supplying the first and second images. Illustrative sensors include, but are not limited to, accelerometer and gyroscopic sensors. The image capture device may, for example, be a stand-alone or embedded digital camera. A second slice region from the second image may be determined based, at least in part, on the motion information and a specified minimum amount of acceptable overlap between the first and second slice regions.

The inventive concept may also be embodied in computer executable instructions that cause a processor (e.g., a central processing and/or graphics processing unit) to perform the disclosed methods. Devices such as personal computers, mobile telephones, and pad computer systems may also be designed to incorporate software and hardware for implementing various embodiments of the disclosed methods.

BRIEF DESCRIPTION OF THE DRAWINGS

FIGS. 1A through 1C show, pictorially, two illustrative image capture sequences. The sequence in FIG. 1A/1B shows a situation where sufficient overlap between successive frames' central regions exist to support blending operations. The sequence in FIG. 1C shows a situation in which there is not sufficient overlap between successive frames' central regions to support blending operations.

DETAILED DESCRIPTION

Figure 2:
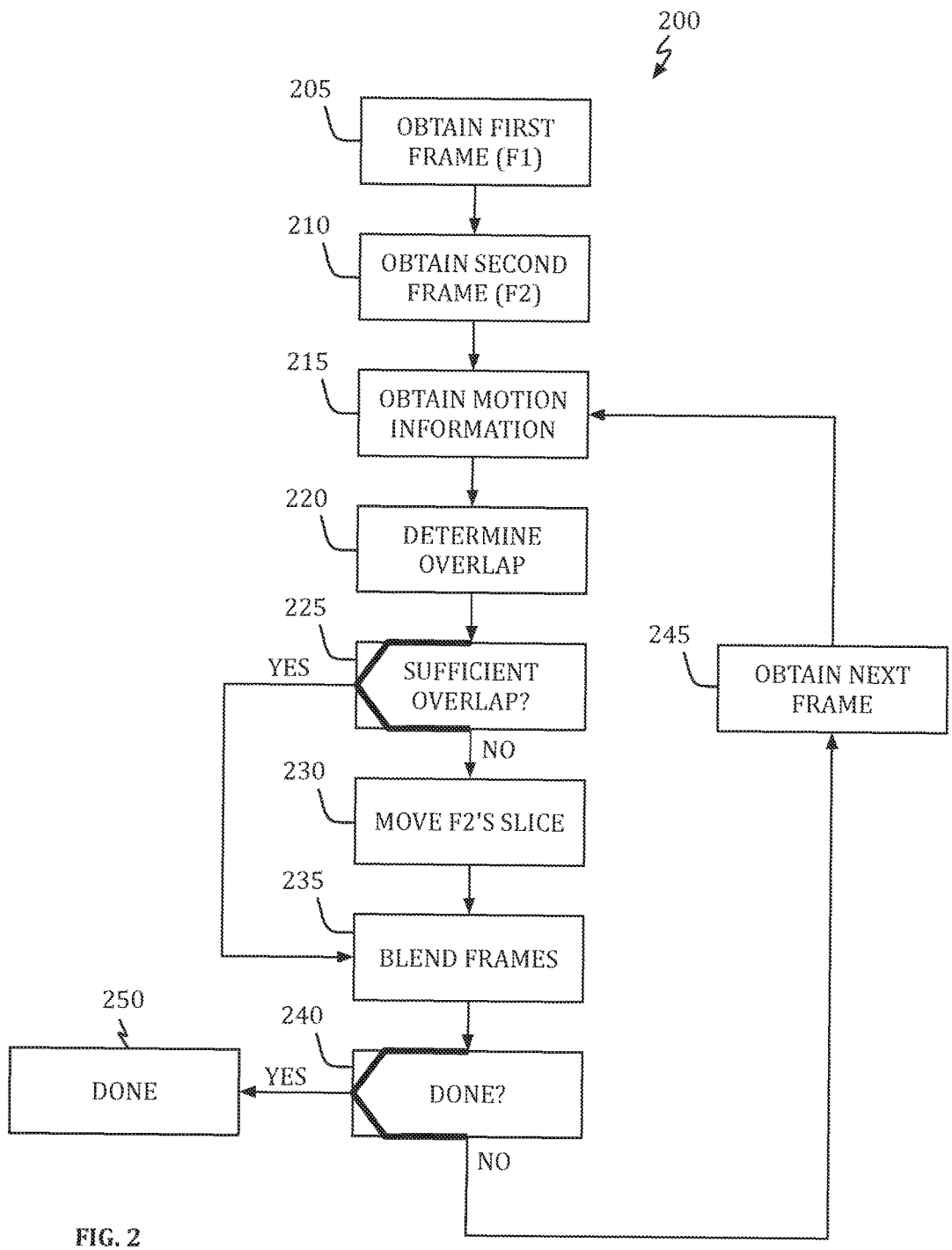
FIG. 2 shows, in flowchart form, a slice selection operation in accordance with one embodiment.

This disclosure pertains to systems, methods, and computer readable media for implementing methods to adaptively select what portion (aka slice) of a first image (aka frame) is selected to overlap and blend with a second frame during the capture of an image sequence. In general, techniques are disclosed for selecting these slices based on the camera's motion. More particularly, for every new frame captured in a sequence of frames, the overlap between its ideal slice and the slice selected from a prior frame may be determined (e.g., the immediately prior frame or the second, third, fourth, . . . frame after the first frame). If this overlap is below some desired level, the position of the current frame's slice can be adjusted so as to provide the desired overlap. As used here, the phrase "ideal slice" means that portion of the new frame that would be selected in the absence of motion during capture of the new frame.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

From a visual presentation standpoint, the center of each image is generally the ideal place from which to select slices for blending operations as this region tends to manifest the least amount of distortion. Under the constraint of always trying to select a slender slice from a frame's center (allowing a cylindrical projection to be approximated by a concatenation of individual planar slices, thereby avoiding cylindrical warping operations), it was recognized that if the image capture device were to move fast enough, image-center slices may not have sufficient (or any) overlap in which to perform a blend operation. When this happens, the final image may include undefined regions which can appear visually as "black" areas in the final wide angle-of-view image.

As noted above, in a wide angle-of-view image the surrounding scene may be depicted as if it were projected onto an imaginary cylindrical manifold. As such, the individual frames forming the panorama must be projected onto this cylindrical manifold before they can be blended into a final panoramic image. By way of example, the capture sequence shown in FIG. 1A illustrates a situation in which frames F1, F2 and F3 (100, 105 and 110 respectively) are captured fast enough (with respect to the image capture device's left-to-right motion) that there is sufficient overlap between them to permit blending operations (e.g., F1-F2 overlap 115 and F2-F3 overlap 120). When this occurs, the central slices from each frame (demarcated by dashed lines) may be concatenated to approximate a cylindrical projection. Cylindrical warping operations may be avoided if the selected slices are slender compared to the frames' from which they are identified. The conditions shown in FIG. 1A are replicated in FIG. 1B, albeit in a different format. It is this latter, FIG. 1B format, that will be used throughout the remainder of this disclosure.

In the capture sequence illustrated in FIG. 1C, frames F4, F5 and F6 (125, 130 and 135 respectively) are captured slowly enough (relative to the image capture device's left-to-right motion) that their central slices 140, 145 and 150 do not overlap. If central slices 140, 145 and 150 are used during wide angle-of-view image generation, the final image will have undefined or black regions where no overlap occurred, areas denoted as 155 and 160.

To overcome the situation where the image capture device is moving to fast for it to capture frames having sufficient overlap between successive central slices, sensor input may be used to move a frame's selected slice in a direction opposite that of the image capture device's motion until at least a specified overlap with the prior frames selected slice is obtained. Referring to FIG. 2, in accordance with one embodiment blend operation 200 begins when first and second frames are captured (blocks 205 and 210). Following capture of frame F2, image capture device motion information may be obtained (block 215). If frames F1 and F2 are captured at approximately the same time, it may be acceptable to obtain motion information as part of acts in accordance with blocks 205 or 210 rather than separately as implied by block 215. Motion information may be obtained, for example, from sensor devices proximate, or affixed to, the image capture device. Illustrative sensors capable of providing this type of information include, but are not limited to, accelerometers and/or gyroscopic sensors. The overlap between the two most recently captured frames (e.g., F1 and F2) may then be determined (block 220). If there is not sufficient overlap between frame F1's prior selected slice and that of frame F2's central region to support blending operations (the "NO" prong of block 225), frame F2's slice may be moved in a direction opposite that of the image capture device's detected motion (block 230). When sufficient overlap between the first two selected slice regions exist (the "YES" prong of block 225 or completion of operations in accordance with block 230), the selected slice regions between the most recently captured two frames may be blended in accordance with any desired blend procedure (block 235). Illustrative blending operations include, but are not limited to, alpha compositing, arithmetic blending operations, Boolean blending operations, and hue, saturation and luminosity blending operations. If additional frames in the current wide angle-of-view image need to be processed (the "NO" prong of block 240), the next frame may be obtained (block 245) where after operations continue at block 215. If frame capture for the current wide angle-of-view image has been completed (the "YES" prong of block 240), blend operation 200 is complete (block 250).

Assuming the image capture device is moving left-to-right, the location of the most recent frame's slice center may be given as:

$$s_{k+1} = \min\{x_{k+1}, s_k + (1-p)W_s\}, \qquad \text{EQ. 1}$$

where $x_{k+1}$ and $s_{k+1}$ represent the horizontal coordinate of the current frame and current slice respectively, $s_k$ represents the coordinate of the prior selected slice's center point, "p" represents the minimum acceptable amount of overlap between the two slices centered at $s_k$ and $s_{k+1}$, and $W_s$ represents the width of the selected slices. See Table 1. As noted below, the slice width $W_s$ may be selected based on two criteria: (i) large enough to ensure a sufficient overlap between slices (this is necessary for both registration and blending operations), and (ii) small enough so that the concatenation of the captured slices provide a good an approximation to a cylindrical projection.

TABLE 1

Selected Notation

| Parameter | Description |
| --- | --- |
| $W_s$ | Width of selected slice |
| p | Minimum percentage overlap between two consecutive slices |
| $x_k$ | Horizontal coordinate of the k-th frame center |
| $s_k$ | Horizontal coordinate of the k-th slice center |

In accordance with EQ. 1, the shift to the left of the current frame's selected slice, relative to its frame center, may be given by:

$$x_{k+1} - s_{k+1} = x_{k+1} - \min\{x_{k+1}, s_{k+1} + (1-p)W_s\} \qquad \text{EQ. 2}$$

By choosing the center of the selected slice, with respect to the center of the frame, as shown herein it is possible to: (i) shift the selected slice to the left when the image capture device's motion is fast $(x_{k+1} > s_k + (1-p)W_s)$; and (ii) select the central region of a frame when the image capture device's motion is slow $(x_{k+1} \leq s_k + (1-p)W_s)$. While the embodiments described here are presented in the context of the image capture device moving left-to-right, one of ordinary skill in the art would readily appreciate application of the disclosed methodology to right-to-left, down-to-up, and up-to-down device motion.

Figure 3A:
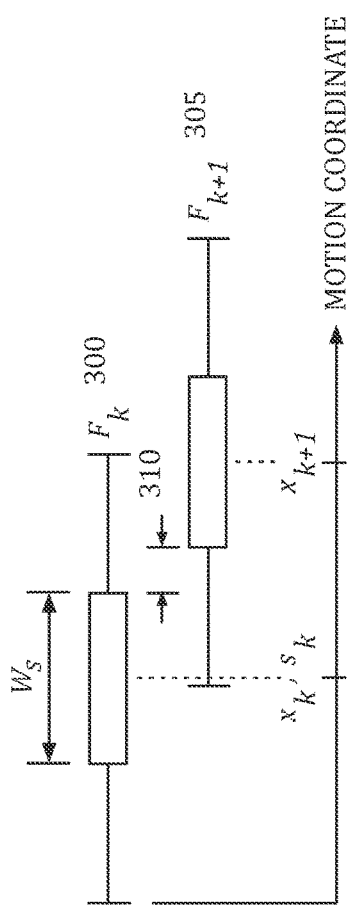
FIG. 3 shows, in schematic form, the movement of a frame's selected slice in response to image capture device motion in accordance with one embodiment.
Figure 3B:
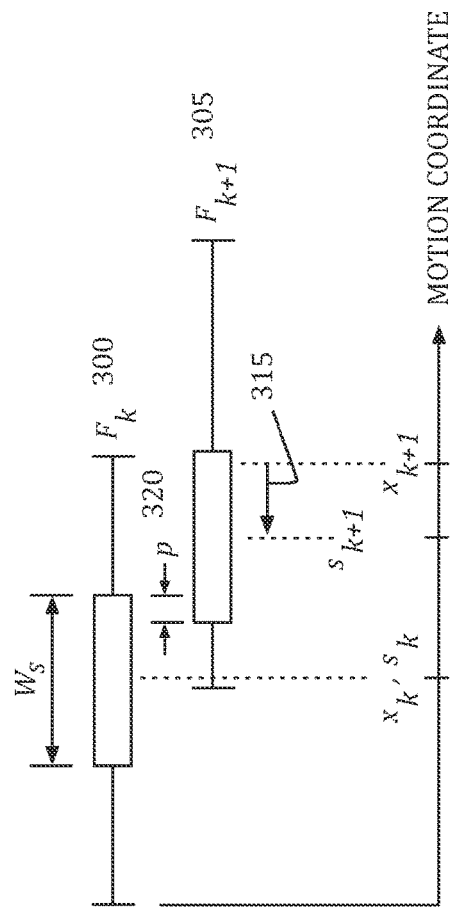

The relationships identified in EQS. 1 and 2 are illustrated in FIGS. 3A and 3B. In FIG. 3A, frame $F_k$ 300 is shown having a width of $W_s$ (for purposes of this discussion all frames have a selected slice width of $W_s$), a frame center coordinate $x_k$, and a selected slice center coordinate $s_k$. Because $x_k$ equals $s_k$ for frame $F_k$, we know that frame $F_k$'s selected slice corresponds to the central region of the frame. FIG. 3A also shows that the next frame, frame $F_{k+1}$, has moved sufficiently to the right that there is no overlap between frame $F_k$'s selected slice (centered at $s_k$) and the central region of frame $f_{k+1}$ (centered at $x_{k+1}$), the amount of missed overlap being designated as 310. In FIG. 3B, the center of frame $F_{k+1}$'s selected slice has been moved in accordance with EQ. 2 to the left as shown by arrow 315 enough to provide an overlap of at least p percent (denoted at 320). Adjusting the value of parameter "p", permits the designer to adjust the size (width) of the blending region to meet the requirements of their, for example, selected blending operation.

In one embodiment each frame may be 1956-by-2592 pixels (corresponding to a 5 Mpix image) and each slice may have a width $W_s$ of approximately 240 pixels (e.g., slices measure 2592-by-240 pixels). By "approximate," it is meant that slice width $W_s$ may vary so long as there remains sufficient overlap between frames and the quality of the cylindrical projection provided by the concatenated slices is sufficiently good, and what is "good" may vary from implementation to implementation. In another embodiment, each frame may be 1200-by-1600 pixels (corresponding to a 2 Mpix image) and an image slice width $W_s$ of approximately 200 pixels (e.g., slices measure 1600-by-200 pixels). In one implementation, the actual overlap percent "p" may be fixed and between approximately 20% and 90%. A large value for p (e.g., 90%) ensures that a high quality blending operation between slices is possible because it allows a large degree of freedom in selecting the transition seam between consecutive slices so as to avoid cutting through moving objects. On the other hand, the larger the value of p, the larger the computational cost because at a large p, many more slices must be blended than for a smaller p. On the low-end (e.g., 20%), p must be at least large enough to ensure sufficient overlap between slices to support both registration and blending operations.

In one embodiment, the selection of the above slice width was informed by an evaluation of the trade-off between how fast the user would likely sweep the image capture device (selecting a slice width that is wide enough to ensure overlap between successive frames), the computational cost (making the slice narrow tends to reduce the computational load), and the image quality of the lens (selecting a region that is most likely to have the least distortion and lens shading) while having enough redundancy to support follow-on blending operations. It should also be recognized that thinner slices provide a better cylindrical manifold approximation. Making the slices to thin, however, reduces the amount of their overlap.

Referring again to FIG. 3, it should be noted that frames $F_{k+1}$ 305 may represent the first, second, third, fourth, fifth, . . . frame captured after frame $F_k$ 300. This latter approach may be appropriate when the image capture device is capable of capturing images rapidly compared to the image capture device's translation across a scene (e.g., 30 frames-per-second). In such cases, it may be possible to follow the approach described herein, or to adaptively adjust what frame is used for blending operations (e.g., using every other frame, every third frame, and so forth). In cases where image capture device motion is so rapid that the device's frame capture rate cannot deliver a minimum acceptable overlap between slices of successively captured frames, however, only slice selection operations in accordance with FIG. 2 can provide sufficient overlap between frames to permit safe blending operations.

Frame slice selection operation 200 has been described in terms of real-time image processing. While operations described herein are applicable and appropriate to real-time processing, the inventive concept is not so limited. For example, the image capture device may record motion information for each frame and incorporate such information into its metadata (along with, perhaps, an indication of which frames belong to a wide angle-of-view image). Using this information at a later time, the same slice selection techniques may be applied using notebook, desktop or workstation style computer systems, as well as portable gaming devices such as the Nintendo DS®. (NINTENDO DS is a registered trademark of Nintendo of America Inc.)

Figure 4:
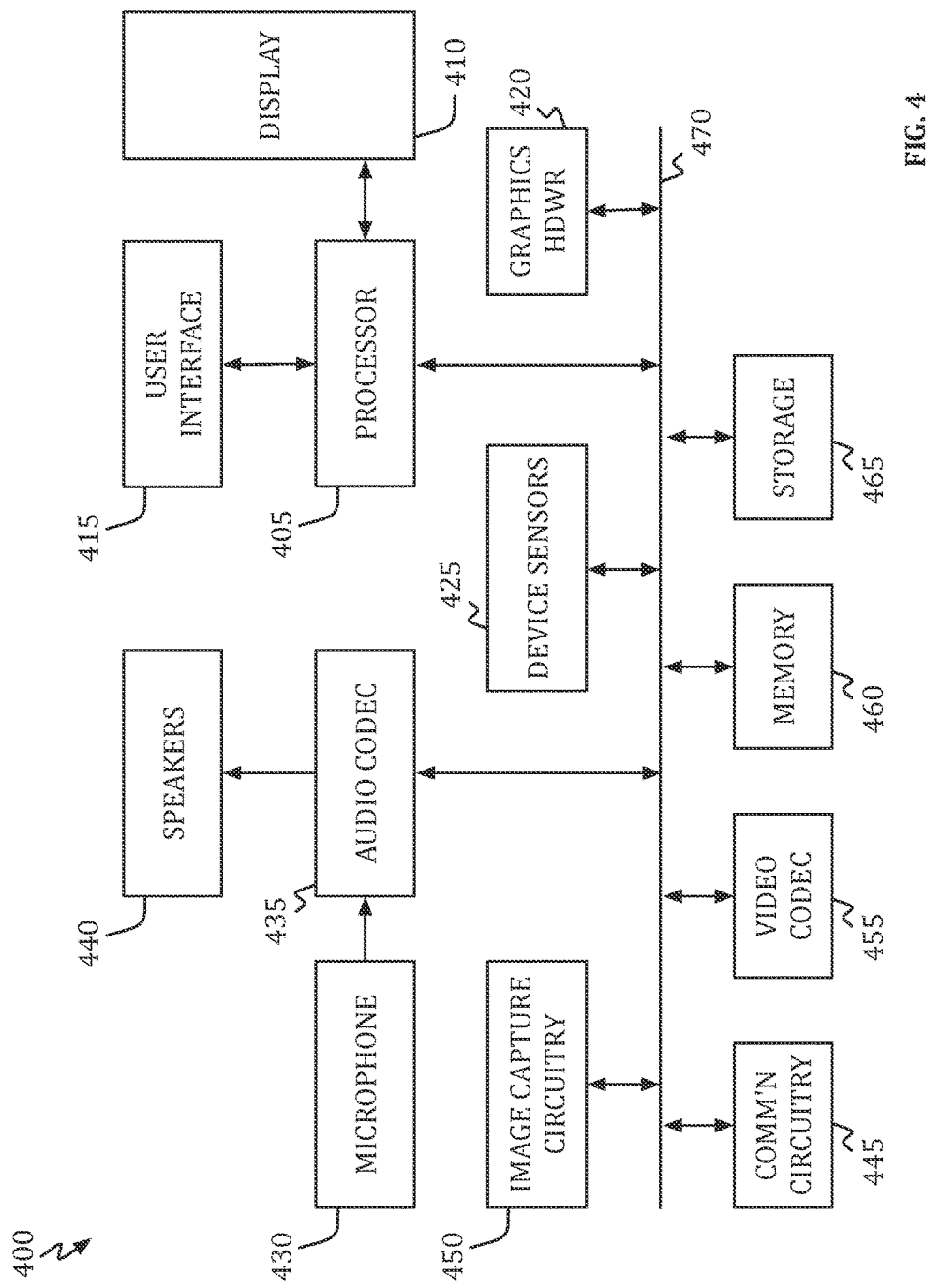
FIG. 4 shows, in block diagram form, an electronic device that can provide at least some of the disclosed capabilities.

Referring to FIG. 4, a simplified functional block diagram of an illustrative electronic device 400 is shown according to one embodiment. Electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, digital image capture unit 450, video codec(s) 455, memory 460, storage 465, and communications bus 470. Electronic device 400 may be, for example, a personal digital assistant (PDA), personal music player, mobile telephone, or a notebook, laptop or tablet computer system.

Processor 405 may execute instructions necessary to carry out or control the operation of many functions performed by device 400 (e.g., such as the generation and/or processing of images in accordance with operation 200). Processor 405 may, for instance, drive display 410 and receive user input from user interface 415. User interface 415 can take a variety of forms, such as a button, keypad, dial, a click wheel, keyboard, display screen and/or a touch screen. Processor 405 may be a system-on-chip such as those found in mobile devices and include a dedicated graphics processing unit (GPU). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 process graphics information. In one embodiment, graphics hardware 420 may include a programmable graphics processing unit (GPU).

Sensor and camera circuitry 450 may capture still and video images that may be processed to generate wide angle-of-view images, at least in part, by video codec(s) 455 and/or processor 405 and/or graphics hardware 420, and/or a dedicated image processing unit incorporated within circuitry 450. Images so captured may be stored in memory 460 and/or storage 465. Memory 460 may include one or more different types of media used by processor 405, graphics hardware 420, and image capture circuitry 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable processor and comprising instructions stored thereon to cause the processor to:
   acquire a first frame and a second frame from an image capture device;
   acquire, from one or more sensor devices, motion information corresponding to the image capture device's motion during the acquisition of the first and second frames;
   identify, based on the motion information, a first slice region in the first frame and a second slice region in the second frame, the second slice region's center being substantially equal to the second frame's center;
   determine, based on the motion information and within an area of overlap between the first and second frames, whether the first and second slice regions overlap each other by at least a specified amount;
   move, based on the motion information and in response to a determination that the first and second slice regions do not overlap each other by at least the specified amount, the second slice region in the second frame in a direction opposite to a direction of the image capture device's motion information so that the second slice region's center is spaced apart from the second frame's center and so that the moved second slice region in the second frame overlaps with the first slice region in the first frame by at least the specified amount; and
   perform a blend operation in the overlap between the first slice region and the moved second slice region to generate a single panoramic image.

2. The non-transitory program storage device of claim 1, the first and second slice regions have a same width.

3. The non-transitory program storage device of claim 2, wherein the specified amount is between 20% and 90% of the width.

4. The non-transitory program storage device of claim 1, wherein the one or more sensor devices are proximate to or affixed to the image capture device.

5. The non-transitory program storage device of claim 1, wherein the instructions to cause the processor to acquire motion information comprise instructions to cause the processor to acquire the motion information from metadata from at least one of the first and second frames.

6. The non-transitory program storage device of claim 2, wherein the width is determined based on one or more of:
   a speed of acquiring the first and second frames;
   an amount of available computational resources; and
   an image quality of a lens of the image capture device.

7. The non-transitory program storage device of claim 1, wherein the first and second frames are not acquired successively.

8. The non-transitory program storage device of claim 1, wherein the instructions to cause the processor to perform the blend operation comprise instructions to cause the processor to perform the blend operation of the first and second frames immediately after moving the second slice region so as to have the overlap by at least the specified amount.

9. The non-transitory program storage device of claim 8, wherein the instructions to cause the processor to perform the blend operation further comprise instructions to cause the processor to display the blended frames.

10. The non-transitory program storage device of claim 9, wherein the instructions to cause the processor to display the blended frames comprise instructions to cause the processor to display the blended frames on a display of the image capture device.

11. The non-transitory program storage device of claim 1, wherein the first slice region's center is substantially equal to the first frame's center.

12. A method to generate a wide angle-of-view image, comprising:
    acquiring a first frame and a second frame from an image capture device;
    acquiring, from one or more sensor devices, motion information corresponding to the image capture device's motion during the acquisition of the first and second frames;
    identifying, based on the motion information, a first slice region in the first frame and a second slice region in the second frame, the second slice region's center being substantially equal to the second frame's center;
    determining, based on the motion information and within an area of overlap between the first and second frames, whether the first and second slice regions overlap each other by at least a specified amount;
    moving, based on the motion information and in response to a determination that the first and second slice regions do not overlap each other by at least the specified amount, the second slice region in the second frame in a direction opposite to a direction of the image capture device's motion information so that the second slice region's center is spaced apart from the second frame's center and so that the moved second slice region in the second frame overlaps with the first slice region in the first frame by at least the specified amount; and
    performing a blend operation in the overlap between the first slice region and the moved second slice region to generate a single panoramic image.

13. The method of claim 12, wherein the first and second slice regions have a same width.

14. The method of claim 13, wherein the specified amount is between 20% and 90% of the width.

15. The method of claim 12, wherein the one or more sensor devices are proximate to or affixed to the image capture device.

16. The method of claim 12, wherein acquiring motion information corresponding to the image capture device's motion comprises acquiring motion information from metadata from at least one of the first and second frames.

17. The method of claim 16, wherein the metadata comprises metadata captured by the image capture device concomitant with capture of at least one of the first and second frames.

18. The method of claim 13, wherein the width is determined based on one or more of:
    a speed of acquiring the first and second frames;
    an amount of available computational resources; and
    an image quality of a lens of the image capture device.

19. The method of claim 12, wherein the first and second frames are not acquired successively.

20. The method of claim 12, wherein performing the blend operation comprises blending the first and second frames immediately after moving the second slice region so as to have the overlap by at least the specified amount.

21. The method of claim 20, wherein performing the blend operation further comprises displaying the blended frames.

22. The method of claim 21, wherein displaying the blended frames comprises displaying the blended frames on a display element of the image capture device.

23. The method of claim 12, wherein the first slice region's center is substantially equal to the first frame's center.

24. An electronic device comprising:
an image capture unit;
one or more sensor devices;
memory operatively coupled to the image capture unit;
a processor operatively coupled to the image capture unit, the one or more sensor devices and the memory, wherein the memory stores data, wherein the data comprises instructions, and wherein the processor is configured to execute the instructions to:
  acquire a first frame and a second frame from the image capture unit;
  acquire, from the one or more sensor devices, motion information corresponding to the image capture unit's motion during the acquisition of the first and second frames;
  identify, based on the motion information, a first slice region in the first frame and a second slice region in the second frame, the second slice region's center being substantially equal to the second frame's center;
  determine, based on the motion information and within an area of overlap between the first and second frames, whether the first and second slice regions overlap each other by at least a specified amount;
  move, based on the motion information and in response to a determination that the first and second slice regions do not overlap each other by at least the specified amount, the second slice region in the second frame in a direction opposite to a direction of the image capture unit's motion information so that the second slice region's center is spaced apart from the second frame's center and so that the moved second slice region in the second frame overlaps with the first slice region in the first frame by at least the specified amount; and
  perform a blend operation in the overlap between the first slice region and the moved second slice region to generate a single panoramic image.

25. The device of claim 24, further comprising a display element, wherein the memory further has instructions stored therein to cause the processor to:
blend the first and second frames immediately after moving the second slice region so as to have the overlap by at least the specified amount; and
display, on the display element, the blended frames.

26. The device of claim 24, wherein the first slice region's center is substantially equal to the first frame's center.

27. The device of claim 24, wherein the first and second slice regions have a same width.

* * * * *